United States Patent Office 3,409,589
Patented Nov. 5, 1968

3,409,589
ADDITION COPOLYMERS OF ALKOXY-SUBSTITUTED PHENYL ESTERS OF ACRYLIC OR METHACRYLIC ACID
Benjamin B. Kine, Elkins Park, Pa., assignor to Rohm & Haas Company, Philadelphia, Pa., a corporation of Delaware
No Drawing. Filed Sept. 2, 1964, Ser. No. 394,064
8 Claims. (Cl. 260—47)

ABSTRACT OF THE DISCLOSURE

The present invention is concerned with solid addition copolymers of ethylenically unsaturated molecules comprising at least about ½% by weight and up to about 95% by weight, but preferably about 1 to 25% by weight, of at least one ($C_1$–$C_4$)alkoxy-substituted-phenyl ester of acrylic or methacrylic acid.

---

The present invention is concerned with solid addition copolymers of ethylenically unsaturated molecules comprising at least about ½% by weight and up to about 95% by weight, but preferably about 1 to 25% by weight, of at least one ester of the formula

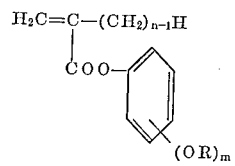

wherein:

$m$ is an integer having a value of 1 to 2,
$n$ is an integer having a value of 1 to 2, and
R is an alkyl group having 1 to 4 carbon atoms.

The preferred substituted phenyl esters used in making the copolymers are those of the formula

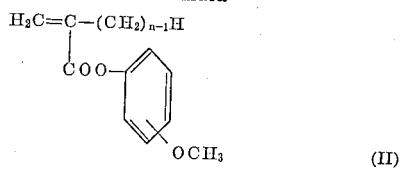

wherein $n$ has a value of 1 to 2.

The compounds of Formula I are essentially esters of acrylic acid or methacrylic acid with a phenol, i.e., with a phenol having one to two alkoxy groups substituted in the ring and optionally having up to 2 alkyl groups substituted in the ring.

These esters are readily made by reacting an acid halide having the formula

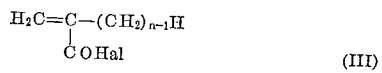

wherein Hal represents chlorine or bromine, with an appropriate substituted alkali metal phenolate such as the sodium phenolates of the formula

The alkali metal phenolate may be obtained from a respective one of the phenols and an alkali such as sodium hydroxide.

The substituted phenols are either known or readily made by known processes. For example, the alkoxy-substituted phenols can be prepared by partial etherification of a polyhydric phenol with dialkyl sulfate in admixture with an alkali, such as sodium hydroxide, potassium hydroxide or other alkali metal or other soluble alkaline earth metal hydroxide, the reaction being effected by heating to 130 to 180° C. using a pressure autoclave. Another general process is to effect partial etherification of a polyhydric phenol by means of a lower aliphatic alkanol ($C_1$ to $C_4$) in the presence of a suitable catalyst, either alkaline or acidic, at elevated temperatures in the range of 100 to 180° C. in an autoclave. For example, the monomethyl ether of resorcinol can be made by heating resorcinol (1 mol) with methanol (1 mol) and sodium bisulfate in an autoclave at about 165 to 170° C.

Examples of polyhydric phenols that may thus be partially etherified to produce the alkoxy-substituted monohydric phenols include catechol, resorcinol, hydroquinone, pyrogallol, and phloroglucinol. The dialkyl sulfates that can be used include dimethyl sulfate, diethyl sulfate, di-n-propyl sulfate, di-isopropyl sulfate, di-n-butyl sulfate, di-isobutyl sulfate, di-sec-butyl sulfate, and di-tert-butyl sulfate. The proportion of the sulfate used should be one mole for each of the hydroxyl groups to be etherified in one mole of the phenol.

Examples of the esters of the present invention may be represented by the formula

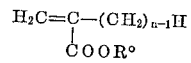

wherein R° is one of the following:

p-methoxyphenyl
o-methoxyphenyl
m-methoxyphenyl
p-ethoxyphenyl
o-ethoxyphenyl
m-ethoxyphenyl
p-propoxyphenyl
o-propoxyphenyl
m-propoxyphenyl
p-n-butoxyphenyl
o-n-butoxyphenyl
p-tert-butoxyphenyl
p-isopropoxyphenyl
p-isobutoxyphenyl
p-sec-butoxyphenyl
2,3-di(methoxy)phenyl
2,3-di(ethoxy)phenyl
2,3-di(butoxy)phenyl
2,6-di(methoxy)phenyl
2,6-di(butoxy)phenyl
3,5-di(methoxy)phenyl The immediately preceding list of esters include both the acrylate and the methacrylate. In the making of the copolymers of the present invention, a single monomer of formula I may be used or mixtures of these esters may be used, such as a mixture of the ortho and para isomers or the ortho and meta isomers or even of all three ortho, meta, and para isomers which may be formed in the usual preparation. Similarly, there may be used mixtures of the 2,3- and 2,6-isomers of the di-alkoxyphenyl esters.

The compounds of Formula I may be copolymerized with any ethylenically unsaturated compound to produce solid addition copolymers of thermoplastic, and in some instances thermosettable nature, depending on the particular comonomer or comonomers.

Examples of monoethylenically unsaturated compounds that may be copolymerized with the compound of Formula I include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazole, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, difumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free radical polymerizable ethylenically unsaturated groups occur, as in divinylbenzene, trivinylbenzene, ethylene diacrylate or methacrylate, bis(vinyloxyethyl)urea, or vinyloxyethyl acrylate or methacrylate, insoluble interpolymers result when over about 1% of the polyethylenically unsaturated compound is used.

Preferred copolymers are those containing about 1 to 10% by weight of monomers having functional groups. These groups may serve various purposes including imparting thermosettability and reactivity toward auxiliary cross-linking materials, such as aliphatic and aromatic polyisocyanates, polyepoxides, aminoplast condensates, and the like. Examples of such monomers include: acids, such as acrylic acid, methacrylic acid, itaconic acid; amides, such as acrylamide, methacrylamide, N-methylol acrylamide, N-methylol-methacrylamide, N-methoxymethyl-acrylamide, N-methoxymethyl-methacrylamide, N-butoxymethylacrylamide, N-methyl-acrylamide, β-ureidoethyl acrylate or methacrylate, β-ureidoisobutyl vinyl ether or sulfide, amines, such as β-aminoethyl vinyl ether, β-aminoethyl vinyl sulfide, β-dimethyl-aminoethyl acrylate or methacrylate, 4-vinylpyridine, 2-vinylpyridine, and 2-methyl-5-vinylpyridine; alcohols such as β-hydroxyethyl acrylate, methacrylate, vinyl ether, or vinyl sulfide and monomers containing vic-epoxy groups, such as glycidyl acrylate and glycidyl methacrylate.

Copolymers containing carboxyl groups may be used in the acid form or they may be neutralized partly or completely, such as with an alkali metal hydroxide or a water-soluble amine. Such neutralization may be employed to adjust the viscosity of aqueous dispersions of water-insoluble emulsion copolymers containing such acid groups. Copolymers containing amine groups may be used on the alkaline side or they may be neutralized partly or completely with an acid.

The compounds of Formula I may be copolymerized in bulk, in solution, or in either an emulsion or suspension technique to produce the various types of polymers constituting the present invention, including the granular type. Solution polymerization may be effected in such solvents as dimethylformamide, xylene, dioxane, in which the compounds of Formula I and any comonomers that may be used are suitably soluble. The compounds of Formula I may be copolymerized by an emulsion technique in which the comonomers and the compound of Formula I are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis(α,γ-dimethylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxy-polyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

Copolymers containing from about 0.5 to 20% by weight or more of the compounds of Formula I with various comonomers are adapted to provide valuable coating and impregnating materials which may be pigmented or not, and may contain plasticizers or not, and in the case of emulsion copolymers, they are adapted to provide valuable water-base paints.

Examples of plasticizers that may be used are dibutyl phthalate, butyl benzyl phthalate, triphenyl phosphate, di-n-hexyl adipate, methyl abietate, ethyl phthalyl ethyl glycolate, tributyl phosphate, diisooctyl phthalate, and glycerol monoricinoleate. Examples of pigments include carbon black, titanium dioxide, ultramarine blue, lead chromate, copper phthalocyanine blues and greens, zinc chromate, zinc oxide, clays, calcium carbonate, lead carbonate, and barium sulfate iron oxides, toluidines, Prussian Blue, Chrome Yellow, Para Red Toners, Lithol Red, Cadmium Red, Chromium oxide.

Copolymers containing at least 1% and preferably from 5 to 20% by weight of a compound of Formula I with ethyl acrylate, butyl acrylate, or the like, especially with about 1 to 5% by weight of a functional monomer, such as N-methylolacrylamide or glycidyl methacrylate, are useful to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 180° F. to 350° F. for a period of one-half to fifteen minutes. The copolymers just described which have apparent second order transition temperatures of about −40° C. to about 20° C. are also excellent binders for non-woven fabrics of all types of natural and synthetic fibers or filaments made by the air-deposition, carding, or garnetting of the fibers or filaments, such as those of rayon, wool, cellulose acetate and other esters and ethers, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 180° F. to 350° F. for a period of one-half to thirty minutes, to cure the polymer thereon. Similar aqueous dispersions made by the emulsion copolymerization of a monomer of Formula I with acrylic esters and especially butyl acrylate or ethyl acrylate are useful, with or without pigment, for the primary coating of leather. Copolymers with acrylonitrile, especially those containing from 75 to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinyl-pyridine, when included in melts or solutions of polymers of acrylonitrile containing 75 to 90% acrylonitrile, such as copolymers thereof with vinyl chloride, vinyl acetate or the like, serve to modify the dyeing properties of fibers and films formed therefrom.

The copolymers, especially solutions thereof in organic solvents or aqueous dispersions thereof obtained by emulsion copolymerization, may also be blended with other resins, such as aminoplast resin-forming condensation products, especially urea-formaldehyde and melamine-formaldehyde condensates, vinyl or acrylic resins, such as polystyrene, polyvinyl chloride, polymethyl methacrylate, cellulose esters and ethers, to form valuable coating compositions. The copolymerization of small amounts (½ to 5%) of a monomer of Formula I with methyl methacrylate in the normal casting procedure for making shaped polymeric articles serves to reduce the susceptibility to solvents. In one preferred manner of operating, the casting may be done under conditions which bring into play substantially only the addition copolymerization reactivity so that the initially obtained casting is still thermoplastic; this casting may then be formed into the ultimately desired shape by heating under conditions which cross-link the copolymer to infusible condition through the reactive groups of the units derived from functional monomeric compounds mentioned previously, such as glycidyl methacrylate, N-methoxymethyl acrylamide, and hydroxy-ethyl acrylate. The emulsion copolymers of the present invention containing about 50 to 80% by weight of acrylonitrile, at least 10% by weight of a $(C_1-C_8)$-alkyl ester of acrylic acid such as ethyl acrylate and 0.1 to 15% by weight of acrylamide or methacrylamide having at least part of its amido hydrogen replaced by methylol or methoxymethyl groups are useful as aqueous coating compositions for coating electrical wires and such compositions may optionally also contain up to 25% by weight, based on the weight of copolymer, of an aminoplast or phenoplast, e.g, phenol-formaldehyde condensate, or an epoxy resin such as a di-glycidyl ether of a polyglycol.

The incorporation of the monomers of the present invention into copolymers containing substantial amounts of an ester of an α,β-monoethylenically unsaturated acid, such as acrylic acid, improves the resistance of the resulting copolymers, and coatings moldings, or impregnations thereof, to deterioration by ultra-violet light. This improvement is especially marked in copolymers containing substantial amounts, e.g. at least about 5% by weight up to about 99% by weight of one or more esters of acrylic acid with an alkanol having 1 to 3 carbon atoms, such as methyl acrylate, ethyl acryalte, n-propyl acrylate, and isopropyl acrylate. The effect of the monomer of Formula I in improving the durability on exposure to ultraviolet light and in weathering generally increases with increasing content of the monomer of Formula I in the copolymer. For this purpose, the proportion of monomer of Formula I is generally at least 2%, and may be as high as 30% by weight of the copolymer. The level may be proportional to the amount of lower alkyl acrylate in the copolymer whose deterioration on exposure to ultraviolet light is under consideration. For most purposes, a proportion of about 3% to 15% by weight of a monomer of Formula I in the copolymer provides outstanding improvement in the resistance to ultraviolet exposure even when the copolymer contains a major proportion (50% or more) of the lower alkyl acrylate.

This characteristic of the copolymers of the present invention is particularly valuable in coating and impregnations where a soft, flexible material is needed, such as in the coating of flexible substrates, such as paper, textiles, and leather. Here, copolymers containing large proportions, such as 40% by weight and more, of a $(C_1-C_3)$-alkyl acrylate, optionally with relatively smaller amounts of methyl methacrylate, acrylonitrile, styrene, vinyl acetate or vinyl chloride, find a great deal of use and incorporation of about 2 to 30% of one or more monomers of Formula I extends to a remarkable degree the durability of the coating or impregnation against U-V light exposure either indoors or outdoors. This is particularly advantageous in such applications as the pigment-printing and pigment-dyeing of textiles which are subjected to frequent launderings with intervening exposure to sunlight wherein progressive fading which would normally occur as a result of the degradation of the polymeric binder with consequent removal of both binder and pigment is markedly reduced by the presence of the units of the monomers of Formula I.

The copolymers may be applied as hot-melt coatings. They may be applied as solutions in such organic solvents as toluene, xylenes, n-butanol, dimethylformamide, or mixtures thereof. If desired, the copolymers may be initially prepared in the solvent by which they are intended to be applied in coating, impregnation, and the like. Again, the copolymers may be applied as aqueous dispersions obtained by emulsion copolymerization.

The copolymer solutions or dispersions of the present invention may be employed for the coating of such materials as paper, leather, textiles, ceramics, and metals which may be either bare or primed with known commercial primers. They may also be employed for the coating of stone, cement, concrete, bricks, asbestos cement shingles, cinder block, and other masonry surfaces which are ordinarily subjected to moist conditions during use for the purpose of providing water-resistant coatings thereon. Such coatings serve to prevent the leaching of calcium, magnesium, and other salts normally present in the cementitious types of products which ordinarily cause effloresence, that is the formation of a white disfiguration or discoloration at the surface of the products on wetting.

In general, the aqueous dispersions or organic solvent solutions of the copolymers may be employed as a clear composition to provide a thin, clear, glossy transparent coating of highly decorative nature. If desired, however, dyes, fillers, or pigments can be included, the amount varying in dependence upon the particular purpose for which the composition is intended to prepare water-base paints or like compositions. Examples of water-insoluble pigments which may be used include azo pigments and lakes, phthalocyanine pigments, vat dyestuffs in their water-insoluble form, and inorganic pigments such as carbon black, iron oxides, chrome yellow, titanium dioxide, and lithopone. Powdered or flaked metals may also be included, such as aluminum, bronze, brass, chromium, or gold. Mixtures may be used if desired. The proportion of pigment used may vary from about 5 to 100% by weight, based on the weight of the copolymer.

The compositions may be used for the stabilization of wool fabrics against shrinkage on washing, as binders for the fibers in non-woven fabrics, and as backcoatings for various types of fabrics such as pile fabrics especially those intended to be used for rugs, giving body to the fabrics and preventing ravelling.

The compositions are particularly useful in the preparation of pigment-printing and pigment-dyeing compositions for application to textile fabrics. In the printing or dyeing of textiles, it has been found that the preferred copolymers having 1 to 10% of functional monomers include thermosetting types which provide capacity for insolubilization as well as improved resistance to light and resistance to successive exposures to light and washing. The employment of appreciably more than 25% by weight of a monomer of Formula I is generally undesirable for this type of application because of undue stiffness and brittleness in the coating so that it is incapable of remaining on the fabric during normal usage in which repeated flexing occurs. Preferably 15 to 20% or less of the monomer of Formula I is used when flexibility rather than stiffness is desired.

In all of the uses to which the polymer coatings formed of the preferred compositions of the invention (containing 1 to 10% of functional groups in the copolymer) are put they can be insolubilized and thereby rendered quite durable either by drying with or without ageing at room temperature, by prolonged subjection to the normal atmosphere in high temperature climates, or by heating the articles coated or impregnated with the polymer coatings described herein to a temperature of 180° F. to 750° F. or higher for periods of time from a few seconds at the higher limit of the temperature range mentioned up to an hour or more at the lower portion thereof. Temperatures of 180° to 310° F. for 10 to 20 minutes are quite satisfactory. An acidic catalyst to accelerate this insolubilization may be included as described hereinafter. The insolubilization or thermosetting quality, in some cases, may require coreaction with a polyfunctional reagent, such as a polyisocyanate, a polyepoxide, or a thermosetting aminoplast condensate. Thus, for example, the aqueous coating compositions formed of these copolymer dispersions may be modified by the addition of a small proportion of certain water-soluble or self-dispersible urea-formaldehyde, N,N'-ethyleneurea-formaldehyde, and aminotriazine-formaldehyde condensates as well as an acidic catalyst. Thus, penta-methylol or hexa-methylol melamine or a methylated penta-methylol or hexa-methylol melamine condensate obtained by etherification with methyl alcohol may be used. The proportion of condensate used is from one-twentieth to one-third of the weight of copolymer. Preferably, the condensate is employed at about 10 to 20% by weight of the copolymer.

The modified coating composition may simply be obtained by the disolution of the formaldehyde condensate within the aqueous dispersion of the emulsion copolymer or in the organic solvent solution of the copolymer prepared as indicated above. In addition, an acidic catalyst is preferably also dissolved in the dispersion or solution of the copolymer and condensate.

As stated, the coating composition may contain a small proportion ranging from about 0.1% to 2% by weight of the total composition of an acidic catalyst to accelerate the condensation of the coating to insoluble and infusible condition. By insoluble, at this point, is meant insolubility not only in water but in organic solvents in general. Examples of the acid catalyst are ammonium phosphate, ammonium thiocyanate, boron trifluoride ethyl etherate, hydrochloric or other acid salts of a hydroxyaliphatic amine including 2-methyl-2-amino-propanol, 2-methyl-2-amino-1,3 - propandiol, tris(hydroxymethyl)aminomethane, 2-phenyl-2-amino-1-propanol, 2 - methyl-2-amino-1-pentanol, 2-amino-butanol, triethanolamine, 2-amino-2-ethyl-1-butanol, also ammonium chloride, pyridine hydrochloride, benzyldimethylamine oxalate. The amine salts are water-soluble latent catalysts substantially neutral at ordinary temperature but dissociate into volatile components one of which is acidic at the elevated temperatures used for baking and curing, so that the catalyst after exerting its accelerating effect is automatically discharged during the heating or curing stage.

In addition to the other ingredients, the aqueous dispersions may contain a water-soluble thickening agent, such as gum tragacanth, water-soluble cellulose ethers, polyvinyl alcohol or partially saponified polyvinyl acetate. The aqueous dispersions may contain a mild alkali, for example, sodium acetate, sodium carbonate, chalk, morpholine, N-methylmorpholine, triethylamine, or ammonia, including if desired, a mixture of water-soluble substances which form a conventional mildly alkaline buffer. The proportions of the several ingredients in the aqueous dispersions can be varied widely, and they are adjusted in any convenient manner so that the dispersions or pastes have a consistency suitable for application by the particular technique to be employed for this purpose.

Of course, when organic solvent solutions of the copolymers are employed, one of the aminoplast condensates may be alkylated with an alcohol of 3 to 6 carbon atoms, especially n-butanol, to impart solubility in the organic solvent used. Instead of aminoplast condensates, polyisocyanates, such as hexamethylene-1,6-diisocyanate, toluene-2,4-diisocyanate, and p-phenylene diisocyanate, can be used.

After application of the thermosetting coating or impregnating compositions of the present invention to whatever substrate is involved, the coated or impregnated material is dried either by simple exposure to the ambient atmosphere or by being subjected to elevated temperatures such as up to 140° to 180° F. Thereafter, the coated material may be subjected to a baking or curing operation involving the subjection thereof to a temperature from about 180° F. up to 750° F. for a time which is inversely proportional to the temperature. For example, at the lower range of temperature the time may be from one-quarter of an hour to somewhat over an hour, such as 1¼ hours in duration; whereas at the upper portion of the temperature range, the time may be on the order of ten seconds to five minutes in duration. In an intermediate preferred range of about 180° to 310° F., a time period of about 10 minutes to 20 minutes may be employed. The heating operation serves to render the coating composition insoluble in organic liquids as well as water and also infusible. The upper limit of temperature and its duration should be so selected and correlated as to avoid decomposition or other damage to the coated or impregnated article. In some cases, insolubilization can be obtained by ageing at room temperature without need for a heating step.

The modified compositions may be applied to any of the substrates mentioned hereinabove in connection with the thermoplastic coating composition such as wood, leather, paper, metals either bare or prime, textiles, masonry surfaces of the type mentioned hereinabove, and plastics surfaces which are not deformed or decomposed at the temperature required for baking or curing.

The compositions may be applied to the substrates in any suitable manner such as by spraying, brushing, roller-coating, dipping, knife-coating, and so on. Excess of the applied material may be wiped by any suitable squeegeeing operation such as between pressure rollers, by air squeegeeing, or by a knife or doctor blade. Thereafter, the coating may be dried as stated hereinabove. Besides simple air-drying, there may be employed for this purpose heated air as in an oven or tunnel drier, radiation such as by infra-red lamps or electrical induction either of electro-magnetic or electro-static high frequency induction devices.

When the coating compositions are applied to substrates having reactive groups, such as paper or textiles formed of cellulosic or proteinaceous fibers, it is believed that when the copolymers containing certain functional groups are used the substrate takes part in the reaction during curing and baking so that the copolymer (and the formaldehyde condensate, or polyisocyanate, or polyepoxide if present) and the substrate are combined chemically, whereby outstanding adhesion, durability, and resistance to water, washing laundering, and solvents including those used for dry-cleaning are obtained.

The following description of the preparation of p-methoxyphenyl methacrylate is a typical method that may be used for making all of the monomeric acrylates or methacrylates used in the present invention:

To a solution of 44 g. of sodium hydroxide in 400 ml. of water in a glass reaction vessel there is added 124 g. (1 mole) of p-methoxyphenol. The resulting solution is cooled to room temperature and while stirring and cooling the solution, there is gradually added 115 g. (1.1 mole) of methacrylyl chloride over a period of 40 minutes during which time the temperature rises to about 50° C. Then the mixture is stirred for an additional hour. The product, p-methoxyphenyl methacrylate, which has precipitated is then filtered, washed with water, vacuum-dried, and may be purified by recrystallization from methanol. Even after recrystallization, a high yield of about 123 g. is obtained. The recrystallized product has a melting point of about 60–61° C.

To assist those skilled in the art to practice the present invention, the following modes of operation are suggested by way of illustration, parts and percentages being by weight unless otherwise specifically noted.

(1)(a) An aqueous dispersion of a copolymer is obtained by the emulsion copolymerization at 60° C. of 10 parts of p-methoxyphenyl methacrylate, 88 parts of ethyl acrylate, and 2 parts of itaconic acid emulsified in 200 parts of water, in the presence of 0.5 part ammonium persulfate and 0.5 part sodium hydrosulfite, by 3 parts of an ethylene oxide condensate of a t-octylphenol containing about 40 oxyethylene units per molecule which serves not only as an emulsifier for the monomers but also as a dispersing agent for the copolymer. A reaction temperature of 60° C. is maintained for 3 to 4 hours. Thirteen parts of methyl methacrylate monomer is then added with stirring. One-half hour later there is added to the reaction 0.14 part of potassium persulfate followed by 0.16 part of sodium bisulfite. On cooling the composition is neutralized with dilute sodium hydroxide to a pH of 7.1. On dilution with 300 parts of water the dispersion is sprayed upon an automotive upholstery leather as a topcoat. The leather is dried at 140° F. A permanent, flexible non-yellowing finish is obtained.

(b) To a piece of side leather which had been coated with a base coat of a polymer of an acrylic ester, a topcoat is applied by spraying onto the leather a mixture composed of:

| | Parts |
|---|---|
| Water | 71.9 |
| NH$_4$Cl | 0.05 |
| The polymer dispersion of part (a) | 50 |
| Dimethoxymethylpolymethylolmelamine | 3.1 |

The treated leather is dried at 80° F. for 3 hours, then it is smooth plated at 150° to 155° F. for 3 seconds. The finished leather withstands wet crocking, water spotting, and a 50,000-cycle flex-test. It is also unaffected by exposure to sunlight.

(2) An aqueous dispersion of a copolymer is obtained by the emulsion copolymerization at 60° C. of 12 parts o-ethoxy-phenyl methacrylate, 85.5 parts ethyl acrylate, 1.14 parts methacrylamide, and 1.36 parts methylol methacrylamide emulsified in 200 parts of water, in the presence of 0.5 part of ammonium persulfate and 0.5 part sodium hydrosulfite, by 3 parts of an ethylene oxide condensate of a t-octylphenol containing about 40 oxyethylene units per molecule. A reaction temperature of 60° C. is maintained for 3 to 4 hours. The pH of the final polymer dispersions is adjusted to pH=10.0 with triethylamine.

(3)(a) An aqueous dispersion of an emulsion copolymer of 45 parts of 3,5-di(methoxy)phenyl methacrylate, 53 parts of ethyl acrylate, and 2 parts of methacrylamide is prepared as in (2).

(b) Forty parts of the dispersion obtained in (2) is mixed with 10 parts of the mixture described in part (a) hereof. The polymer dispersion thus obtained is applied to paper products as follows:

Pieces of 20-mil chipboard (bakery board coated on one side) are roller-coated on the chip side with the polymer dispersion so as to provide a coating of 3 to 4 pounds of dispersion solids per thousand square feet of chipboard. Pieces of kraft bag paper and wallpaper are treated in the same manner. The coatings dry rapidly at 210° F. They are resistant to oils, fats, and greases. They repel water and, when exposed to sunlight for long intervals of time, they do not discolor or pick up dirt and soil.

(4) A solution composed of 10 parts of a resin-forming dimethoxymethylpolymethylolmelamine condensate, 20 parts of diethyl phthalate, and 1.7 parts of triethylamine is added to the composition described in (2). The mixture is then diluted with 100 parts of water and sprayed onto an asbestos-cement sheet so that 2 to 3 grams of resin solids per square foot are applied. The coated sheet is then dried at 130° C. for 5 minutes.

A second series of asbestos-cement sheets are sprayed with a mixture composed of 40 parts of the polymer dispersion prepared in (2), 10 parts of the polymer dispersion prepared in (3)(a) and 10 parts of water. One and one-half to 2.5 grams of resin solids per square foot are applied. The sheets are then dried for 16 hours at 95° C.

Sheets so coated may be stacked to a height of 2 to 3 feet without evidencing blocking. These sheets repel water and after outdoor exposure, are essentially unchanged in appearance. They show no efflorescence, collect no dirt, and evidence no fading; whereas uncoated shingles or shingles containing styrene in the coating appear faded, dirty, and somewhat lighter in color.

(5)(a) An aqueous dispersion of a copolymer is obtained by the emulsion copolymerization as in (2) of 10 parts of p-n-butoxyphenyl acrylate, 88 parts of ethyl acrylate and 2 parts of itaconic acid. On cooling, the polymerized composition is neutralized with dilute sodium hydroxide solution to a pH of 7.1.

A textile dyeing composition is prepared by mixing 11 parts of this emulsion polymer dispersion with:

2.5 parts of a copper phthalocyanine blue pigment available under the trade name Monastral Blue BFR 5 parts of a 1% aqueous solution of t-octylphenoxy-polyethoxyethanol having about 10 oxyethylene units per molecule 15 parts of sodium alginate (0.5% aqueous solution)

Water to make 300 milliliters total dispersion.

Then the mixture is adjusted to a pH of 8 to 9 with ammonium hydroxide.

A sample of 80 x 80 cotton percale is padded with one dip and one nip through the above dyeing composition. It is then framed, dried for 5 minutes at room temperature, and then heated for 10 minutes at 300° F.

The above pigment-dyed sample was compared with one formed in the same way but with a copolymer containing methyl methacrylate as a replacement for the p-n-butoxyphenyl acrylate. Each sample was exposed for 50 hours in a fadeometer, then given a full sanforize wash. The p-n-butoxyphenyl acrylate-containing sample retained 85% of its initial color, whereas the methyl methacrylate-containing sample retained only 30% of its initial color.

(b) Part (a) is repeated except the copolymer is a copolymer of 10 parts of p-methoxyphenyl methacrylate, and 90 parts of ethyl acrylate. After cyclic ageing as described in part (a), the sample retains about 100% of its initial color.

(6)(a) An aqueous dispersion of a copolymer is made as in (2) by the emulsion copolymerization at 60° C. of 8 parts of p-methoxyphenyl acrylate, 88 parts of ethyl acrylate, and 4 parts of N-methylolacrylamide. The composition is neutralized with dilute sodium hydroxide to a pH of 7.1 and is then diluted with 300 parts of water and sprayed upon a non-woven textile fabric formed of three superposed carded webs of cotton fibers. The sprayed fabric is then dried ten minutes at 140° C. to bind the fibers in the fabric. A permanent, flexible, non-yellowing fibrous product is obtained which is resistant to ultraviolet light and to laundering.

Similar fibrous products are bonded with a similarly prepared copolymer of 96% ethyl acrylate with 4% N-methylolacrylamide and a similarly prepared copolymer of 88% ethyl acrylate, 4% N-methylolacrylamide acid, and 8% phenyl acrylate. The products are then subjected to ultraviolet light for 25 hours. The p-methoxyphenyl acrylate copolymer binder becomes progressively more solvent-resistant when tested in an equal volume mixture of toluene with methyl isobutyl ketone, being only slightly swollen after 25 hours exposure and still wash-fast, whereas the other copolymers continue to swell excessively in the solvent throughout the exposures and the washing of the products bonded therewith after the 25-hour ultraviolet exposure causes complete disintegration of the fabrics.

(b) Part (a) is repeated except that the p-methoxyphenyl acrylate is replaced with 2,6-di(ethoxy)phenyl acrylate. Similar results are obtained.

(7)(a) An aqueous dispersion of an emulsion copolymer of 10.5 parts of p-methoxyphenyl acrylate, 75 parts of ethyl acrylate, 12 parts of 2-ethylhexyl acrylate, and 2.5 parts of N-methylolacrylamide is prepared as in (2). An aqueous coating composition is prepared containing 5% by weight of this copolymer, 0.5% of a copper phthalocyanine blue pigment, 0.11% of ammonia, 0.5% of an ethylene oxide condensate of t-octylphenol containing about 10 oxyethylene units, 0.075% of sodium alginate, and 0.20% of the hydrochloride of 2-methyl-2-aminopropanol-1. Ammonium hydroxide is added to this composition to adjust the pH to about 8.5.

(b) A piece of 80 x 80 cotton sheeting is passed through the pigment dispersion and is then passed through the nip of a pair of squeeze rolls. It is supported on a frame and dried by exposure to the ambient atmosphere for 5 minutes. It is then cured while still on the frame for 10 minutes at 300° F. The fabric remains soft and flexible. It shows good resistance to washing and laundering (on testing by washing 40 minutes in 0.1% sodium stearate at 180° F. while tumbling, followed by several ten-minute rinses in water); it is resistant to dry cleaning by the use of perchloroethylene; it exhibits practical resistance to crocking; and its resistance to washing remains substantially unaffected even after exposure to ultraviolet light (on testing by a so-called "cyclic ageing" test involving exposure to ultraviolet light in a fadeometer for 50 hours followed by the washing test described above).

(c) Similar results are obtained when the procedure of parts (a) and (b) are repeated except that the p-methoxyphenyl acrylate is replaced with 10.5 parts of a mixture of the o-, m-, and p-isomers of methoxyphenyl methacrylate in the relative proportions of 30:10:60 parts by weight.

(d) The procedure of parts (a) and (b) is repeated using a copolymer of 15% p-methoxyphenyl methacrylate, 5% of N-methoxymethyl methacrylamide, and 80% of methyl acrylate. The pigment-dyed fabric is similar to that obtained in part (b) and is characterized by outstanding resistance to cyclic-ageing.

(e) When parts (a) and (b) are repeated with a similar copolymer made with 10.5 parts of methyl methacrylate replacing the alkoxyphenyl acrylate or methacrylate, the washing after 50 hours ultraviolet exposure causes removal of a large portion of the color.

(8) A pile fabric used in upholstery and having a base fabric of cotton and a pile of viscose rayon and cellulose acetate is back-coated with a paste consisting of 100 parts of a 46% solids emulsion copolymer of about 10% of p-n-propoxyphenyl methacrylate, about 87.5% of ethyl acrylate, and about 2.5% of N-methylolacrylamide and 100 parts of a 4% solution in water of methyl cellulose adjusted to a pH of 8.5 with ammonia. The fabric is dried 10 minutes at 250° F. and cured 10 minutes at 300° F.

A similar pile fabric is similarly back-coated with a copolymer of about 10% of methyl methacrylate, about 87.5% of ethyl acrylate, and about 2.5% of N-methylolacrylamide.

Duplicate samples of each fabric are exposed to ultraviolet light in the fadeometer for 120 hours, then washed with 0.1% t-octylphenoxypolyethoxyethanol (about 10 oxyethylene units) plus 30% NaCl on weight of ballast, made up of 10 towels plus 4 samples, liquor ratio 40:1, at 200° for 1 hour.

The fabric carrying the p-n-propoxyphenyl methacrylate back-coating exhibits relatively slight fraying resulting from ravelling, whereas the other fabric is badly frayed.

(9) A polymer is prepared as follows:

The polymerization apparatus consists of a 2-liter three-neck glass flask equipped with a stirrer, a reflux condenser, an addition funnel, a thermometer, and a nitrogen delivery tube. A slow current of dry nitrogen is passed above the liquid during the entire polymerization process. The flask is jacketed so that it could be heated by a hot water bath or cooled by a cold water bath.

To the polymerization flask is charged 260 parts of butyl acetate and this solvent is heated to 80° C. To this is added during two hours, a mixture of

| | Parts |
|---|---|
| Butyl acrylate | 336 |
| p-Methoxyphenyl methacrylate | 50 |
| N-methoxymethyl methacrylamide | 14 |
| Azobisisobutyronitrile | 0.14 |

The temperature of the batch is maintained at 75–90° C. Additional charges of 1.92 part of azobisisobutyronitrile in 53 parts of xylene are added in five equal portions after 3.5, 4, 4.5, 5, and 5.5 hours. At the end of 7 hours, 180 parts of xylene is added and the mixture is cooled. The clear and colorless solution contains about 40% of a copolymer of about 84% butyl acrylate, about 12.5% p-methoxyphenyl methacrylate, and about 3.5% N-methoxymethyl-methacrylamide.

(10) 1% (based on polymer solids) of n-butyl acid phosphate is added to the 40% solution obtained in (9) and the resulting solution is applied to a heat-set, finish-free, lightweight nylon taffeta rainwear fabric weighing 2.5 oz. per square yard and having a count of 160 x 80. The application of the catalyzed polymer may be made by a floating knife-coater at a rate of about 0.4 oz. per square yard. The coated fabric is dried and cured by heating for 5 minutes at 260° F. Then a topcoating is applied and heated to dry and cure in the same way as the first or base coat using a solution in the same solvent containing 40% of a copolymer of 84% ethyl acrylate, about 12.5% p-methoxyphenyl methacrylate, and about 3.5% N-methylol-4-pentenamide.

The finished fabric is waterproof and remains so even after washing and dry cleaning in perchloroethylene.

I claim:

1. A solid addition copolymer of about 1% to about 25% by weight of at least one compound of the formula

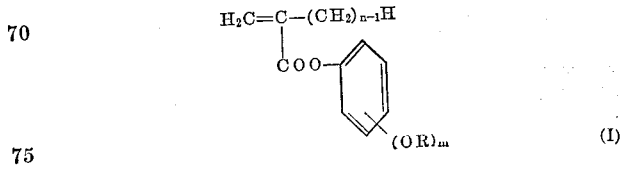

wherein:

$m$ is an integer having a value of 1 to 2,
$n$ is an integer having a value of 1 to 2, and
$R$ is an alkyl group having 1 to 4 carbon atoms,
and at least one other copolymerizable monoethylenically unsaturated monomer.

2. A solid addition copolymer of about 1% to about 25% by weight of at least one compound of the formula

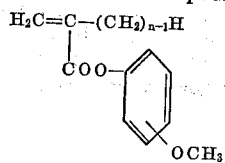 (II)

wherein:

$n$ is an integer having a value of 1 to 2.

3. A solid addition copolymer of at least 40% by weight of at least one ester of acrylic acid with an alkanol having 1 to 3 carbon atoms and about 2% to 30% by weight of at least one compound of the formula

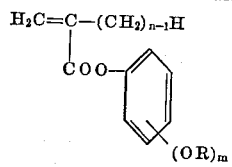 (I)

wherein:

$m$ is an integer having a value of 1 to 2,
$n$ is an integer having a value of 1 to 2, and
$R$ is an alkyl group having 1 to 4 carbon atoms.

4. A solid addition copolymer of copolymerizable monoethylenically unsaturated molecules comprising at least one monomer selected from the group consisting of methyl methacrylate, acrylonitrile, styrene, vinyl acetate, vinyl chloride and about ½% to 25% by weight of at least one compound of the formula

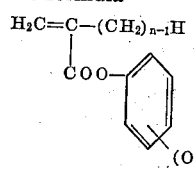 (I)

wherein:

$m$ is an integer having a value of 1 to 2,
$n$ is an integer having a value of 1 to 2, and
$R$ is an alkyl group having 1 to 4 carbon atoms.

5. A solid addition copolymer of copolymerizable monoethylenically unsaturated molecules comprising at least one ester of an acid of the formula

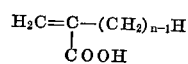

wherein $n$ is an integer having a value of 1 to 2, with a saturated alcohol having 1 to 18 carbon atoms and about ½% to about 25% by weight of at least one compound of the formula

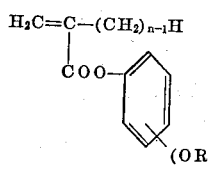 (I)

wherein:

$m$ is an integer having a value of 1 to 2,
$n$ is an integer having a value of 1 to 2, and
$R$ is an alkyl group having 1 to 4 carbon atoms, and up to about 10% by weight of a monoethylenically unsaturated monomer having a functional group selected from the group consisting of amido, amine, hydroxyl, vic-epoxy, and carboxyl in acid or in the form of a salt of ammonia, an amine, or an alkali metal hydroxide.

6. A solid addition copolymer of at least 40% by weight of at least one ester of acrylic acid with an alkanol having 1 to 3 carbon atoms and about 2% to 30% by weight of at least one compound of the formula

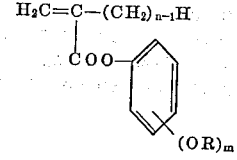 (I)

wherein:

$m$ is an integer having a value of 1 to 2,
$n$ is an integer having a value of 1 to 2, and
$R$ is an alkyl group having 1 to 4 carbon atoms, and up to about 10% by weight of a monoethylenically unsaturated monomer having a functional group selected from the group consisting of amido, amine, hydroxyl, vic-epoxy, and carboxyl in acid or in the form of a salt of ammonia, an amine, or an alkali metal hydroxide.

7. A solid addition copolymer of copylmerizable monoethylenically unsaturated molecules comprising at least one monomer selected from the group consisting of methyl methacrylate, acrylonitrile, styrene, vinyl acetate, vinyl chloride and about ½% to 25% by weight of at least one compound of the formula

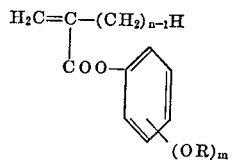 (I)

wherein:

$m$ is an integer having a value of 1 to 2,
$n$ is an integer having a value of 1 to 2, and
$R$ is an alkyl group having 1 to 4 carbon atoms, and up to about 10% by weight of a monoethylenically unsaturated monomer having a functional group selected from the group consisting of amido, amine, hydroxyl, vic-epoxy, and carboxyl in acid or in the form of a salt of ammonia, an amine, or an alkali metal hydroxide.

8. A solid addition copolymer of copolymerizable monoethylenically unsaturated molecules comprising at least one monomer selected from the group consisting of methyl methacrylate, acrylonitrile, styrene, vinyl acetate, vinyl chloride, at least 40% by weight of at least one ester of acrylic acid with an alkanol having 1 to 3 carbon atoms, about ½% to 25% by weight of at least one compound of the formula

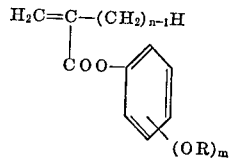 (I)

wherein:

$m$ is an integer having a value of 1 to 2,
$n$ is an integer having a value of 1 to 2, and
$R$ is an alkyl group having 1 to 4 carbon atoms, and up to about 10% by weight of a monoethylenically unsaturated monomer having a functional group selected from the group consisting of amido, amine, hydroxyl, vic-epoxy, and carboxyl in acid or in the form of a salt of ammonia, an amine, or an alkali metal hydroxide.

(References on following page)

References Cited

UNITED STATES PATENTS 3,133,042  5/1964  Tocker _____ 260—47

FOREIGN PATENTS 965,365  7/1964  Great Britain.

OTHER REFERENCES

Katou et al., Cases of Hindered Polymer of Monomers of Aryl Methacrylate Series, in Zhur. Obshchei Khim., 28, 417–21 (1958).

JOSEPH L. SCHOFER, *Primary Examiner.*

M. B. KURTZMAN, *Assistant Examiner.*